United States Patent [19]
Bronicki

[11] Patent Number: 5,640,842
[45] Date of Patent: Jun. 24, 1997

[54] SEASONALLY CONFIGURABLE COMBINED CYCLE COGENERATION PLANT WITH AN ORGANIC BOTTOMING CYCLE

[76] Inventor: Lucien Y. Bronicki, 5 Brosh Street, Yavne, Israel

[21] Appl. No.: 480,865

[22] Filed: Jun. 7, 1995

[51] Int. Cl.$^6$ .................................................. F02C 1/00
[52] U.S. Cl. ........................ 60/39.181; 60/39.3; 60/655; 122/713
[58] Field of Search .................. 60/89.07, 39.3, 60/39.181, 39.182, 39.5, 39.51, 655, 667; 122/7 R, 7 B

[56] References Cited

U.S. PATENT DOCUMENTS

| | | | |
|---|---|---|---|
| 2,633,707 | 4/1953 | Hermitte et al. | 60/39.182 |
| 3,303,646 | 2/1967 | Southam | 60/655 |
| 3,307,350 | 3/1967 | Squires | 60/39.181 |
| 3,621,653 | 11/1971 | Pacault et al. | 60/655 |
| 4,214,450 | 7/1980 | Nagashima et al. | 60/39.182 |
| 4,301,650 | 11/1981 | Gubser | 60/655 |
| 4,429,536 | 2/1984 | Nozawa | 60/655 |
| 4,542,625 | 9/1985 | Bronicki | 60/655 |
| 4,814,325 | 3/1989 | Mandrin | 60/39.181 |
| 5,437,157 | 8/1995 | Bronicki | 60/655 |
| 5,526,646 | 6/1996 | Bronicki et al. | 60/655 |

FOREIGN PATENT DOCUMENTS 7323455  2/1975  France ........................ 60/655

Primary Examiner—Timothy Thorpe
Assistant Examiner—Ted Kim
Attorney, Agent, or Firm—Donald M. Sandler

[57] ABSTRACT

A seasonally configurable combined cycle cogeneration plant of the type having a gas turbine unit for producing power and hot exhaust gases, includes a heat recovery water heater for receiving the exhaust gases. The heat recovery water heater contains an indirect contact heat exchanger for exchanging heat in the exhaust gases with water in the heat exchanger which produces hot water as a result. The plant further includes a hot water utilization device responsive to hot water supplied thereto for utilizing heat in the hot water in an amount that varies seasonally. Also included is an organic Rankine cycle converter having a vaporizer responsive to hot water supplied thereto for producing organic vapor, an organic vapor turbine for expanding the organic vapor and producing expanded organic vapor and power, an organic vapor condenser for condensing the expanded organic vapor and producing condensate, and means for returning the condensate to the vaporizer. Selectively adjustable valves connect the heat recovery water heater to the hot water utilization device and to the converter for selectively regulating the amount of hot water supplied to the vaporizer of the converter and to the hot water utilization device.

9 Claims, 2 Drawing Sheets

FIG. 3A (SUMMER)

FIG. 3B (WINTER)

SEASONALLY CONFIGURABLE COMBINED CYCLE COGENERATION PLANT WITH AN ORGANIC BOTTOMING CYCLE

DESCRIPTION

1. Technical Field

This invention relates to a seasonally configurable combined cycle cogeneration system, and more particularly, to a plant of the type that supplies hot water to a hot water utilization device such as a district heating system..

2. Background of the Invention

In a combined cycle, cogeneration power plant, heat contained in hot exhaust gases produced by a gas turbine driving a generator, is supplied to a heat recovery steam generator (HRSG) that generates steam supplied to a steam turbine that produces additional power. This arrangement may be used when the power plant is associated with a hot water utilization device such as a district heating system. The latter is a system which uses low grade heat for space heating, and/or light industrial purposes, a significant aspect of which is a seasonal variation in the heat load imposed by the system.

In the conventional power plant describe above, steam bled from an intermediate stage of the steam turbine would supply the hot water utilization device. The spent, cooled water produced by the hot water utilization device would be returned to the HRSG together with condensate produced by a condenser associated with the exhaust of the steam turbine in order to complete the water loop.

A number of problems exist with this conventional arrangement. First, HRSG's and steam turbines are relatively complicated, and thus expensive in terms of initial cost and maintenance, primarily because of the pressures used to maximize thermal efficiency. Moreover, system controls and operation are complicated in order to ensure adequate and safe control of the steam turbine in combination with the hot water utilization device. Water treatment is mandatory for steady-state, year round operation. And finally, when the heat required by the hot water utilization device varies seasonally, the controls required become even more complicated.

It is therefore an object of the present invention to provide a new and improved combined cycle cogeneration power plant which is simpler and less expensive to set up and operate than power plants of the prior art.

BRIEF DESCRIPTION OF THE INVENTION

According to the present invention, a seasonally configurable combined cycle cogeneration plant of the type having a gas turbine unit for producing power and hot exhaust gases, includes a heat recovery water heater for receiving the exhaust gases. The heat recovery water heater contains an indirect contact heat exchanger for exchanging heat in the exhaust gases with water in the heat exchanger which produces hot water as a result. The plant further includes a hot water utilization device responsive to hot water supplied thereto for utilizing heat in the hot water in an amount that varies seasonally. Also included is an organic Rankine cycle converter having a vaporizer responsive to hot water supplied thereto for producing organic vapor, an organic vapor turbine for expanding the organic vapor and producing expanded organic vapor and power, an organic vapor condenser for condensing the expanded organic vapor and producing condensate, and means for returning the condensate to the vaporizer. Finally, the invention includes selectively adjustable valves connecting the heat recovery water heater to the hot water utilization device and to the converter for selectively regulating the amount of hot water supplied to the vaporizer of said converter and to said hot water utilization device.

Preferably, during one mode of operation of the plant, when the hot water utilization device has a reduced heat load, the valves are adjusted to cause the hot water from the indirect contact heat exchanger to serially pass though the vaporizer of the organic Rankine cycle converter before being supplied to the hot water utilization device. In another mode of operation, when the hot water utilization device has a maximum need for heat, the valves are adjusted to cause hot water from the indirect contact heat exchanger to by-pass the vaporizer of said converter, and flow directly to the hot water utilization device. Finally, instead of the above-described "on-off" operation, the valves may be adjusted to divert some, but not all, of the flow from the heat exchanger of the heat recovery water heater to the vaporizer of the converter.

The condenser for the organic vapor turbine may be air-or liquid-cooled depending on ambient conditions. When the condenser is cooled by a liquid coolant, the resultant heated coolant is advantageously supplied to a preheater interposed between the return from the hot water utilization device and the heat recovery water heater. In this manner, spent, cooled water from the hot water utilization device is preheated before entering the heat recovery water heater.

BRIEF DESCRIPTION OF THE DRAWINGS

Embodiments of the present invention are described by way of example with reference to the accompanying drawings wherein:

FIG. 3A shows the hot water flow path during one mode of operation of the plant of FIG. 2 wherein the district heating system has a relatively low heat load;

FIG. 3B shows the hot water flow path during one mode of operation of the plant of FIG. 2 wherein the district heating system has a relatively high heat load;

DETAILED DESCRIPTION

Figure 1:
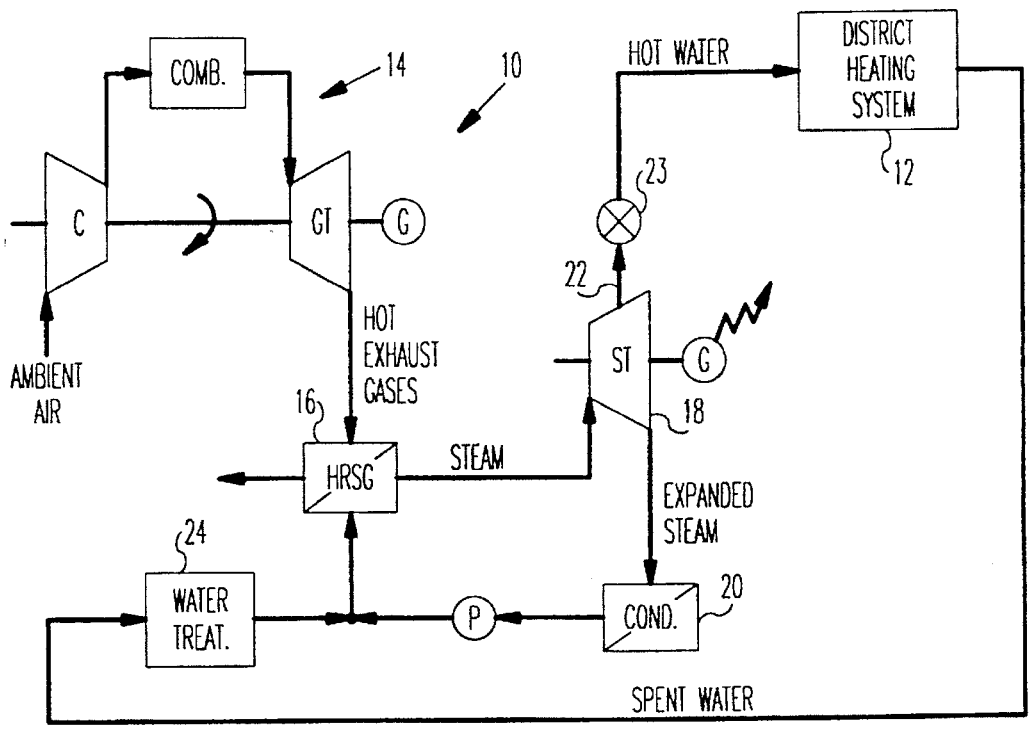
FIG. 1 is a schematic block diagram of a conventional combined cycle cogeneration power plant showing how low grade heat is supplied to a heat utilization device such as a district heating system.

Referring now to the drawings, reference numeral 10 in FIG. 1 designates a conventional combined cycle cogeneration power plant showing hot water being supplied to a heat utilization device in the form of district heating system 12. Gas turbine unit 14 produces hot exhaust gases as the turbine drives a generator that produces power. Heat contained in these gases is transferred to water contained in heat recovery steam generator 16 producing steam that is expanded in steam turbine 18 producing power and expanded steam which is condensed in condenser 20. Condensate produced by this condenser is returned by a cycle pump to steam generator 16.

Low grade steam is bled from intermediate stage 22 of turbine 18 and passed through reducing valve 23 before being converted to hot water that is piped to system 12. Spent, cooled water produced by system 12 is returned to steam generator 16 via water treatment unit 24.

Figure 2:
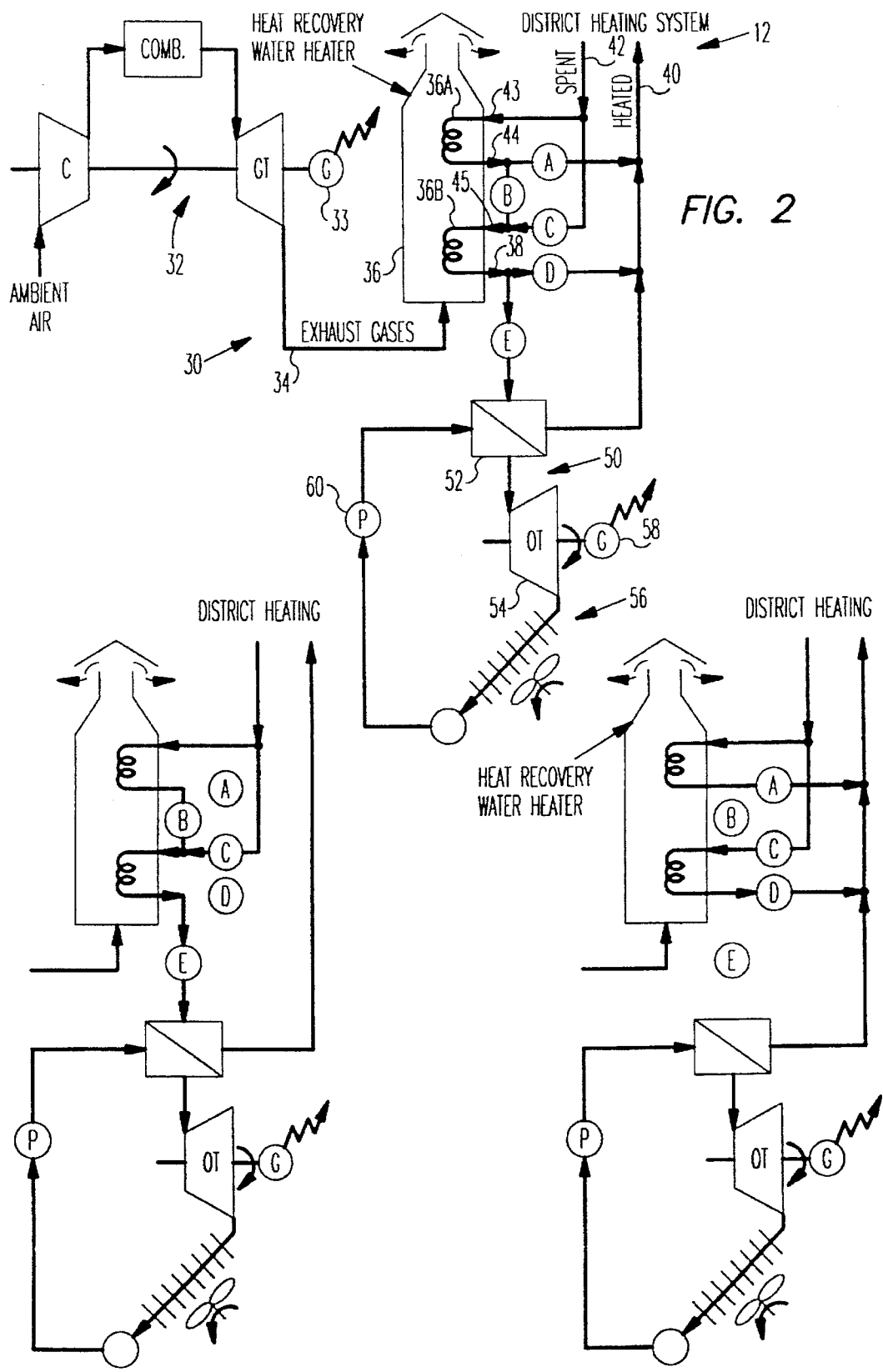
FIG. 2 is a schematic block diagram of a combined cycle cogeneration power plant according to the present invention showing a heat recovery water heater, a hot water utilization device, and an organic Rankine cycle converter.

As shown in FIG. 2, power plant 30, according to the present invention, includes gas turbine unit 32 for producing power from generator 33 and hot exhaust gases in exhaust line 34. The exhaust gases are vented to the atmosphere through heat recovery water heater 36 which contains an indirect contact heat exchanger in the form of a plurality of sets of coils 36A, 36B for exchanging heat in the exhaust gases with water in the coils producing hot water that exits at outlet 38. A hot water utilization device, in the form of district heating system 12, is responsive to hot water supplied thereto via inlet line 40. System 12 utilizes heat in the hot water in line 40 in amounts that vary seasonally, and produces spent, cooled water that is returned to heater 36 via line 42.

The spent water enters inlet 43 of upper coil 36A adjacent the top of the stack that defines the shell of heater 36, and exits this coil at outlet 44 which is connected to line 40 via valve A, and to inlet 45 of lower coil 36B via valve B. Line 42 carrying spent water is also connected to inlet 45 via valve C with the result that spent water from system 12 is applied to coils 36A and 36B in parallel when valve C is in its open state. When valve B is in its open state and valve A is in its closed state (FIG. 3A) a portion of the spent water passes through coil 36A and is heated, but all of the spent water passes through coil 36B and is heated further.

Outlet 38 of coil 36B is connected to line 40 via valve D. When valves A, C, and D are in their closed state, and valve B is in its open state (FIG. 3B), a portion of the spent water passes through coil 36A and the balance passes though coil 36B.

Organic Rankine cycle converter 50 is connected to outlet 38 through valve E. Converter 50 includes vaporizer 52 containing an organic fluid, such as isopentane, and is responsive to hot water supplied thereto via valve E for producing organic vapor. Organic vapor turbine 54 expands the organic vapor and produces expanded organic vapor that is applied to organic vapor condenser 56, and drives generator 58 which produces power.

Condenser 56 condenses the expanded organic vapor exhausted from turbine 54 and produces condensate, and cycle pump 60 returns the condensate to the vaporizer to complete the organic fluid loop. If condenser 56 is sufficiently elevated relative to the vaporizer, the cycle pump may be eliminated.

Valves A, B, C, D, and E constitute selectively adjustable valves that connect heat recovery water heater 36 to hot water utilization device 12, and to converter 50 for selectively regulating the distribution of hot water supplied to vaporizer 52 of the converter and to hot water utilization device 12. Specifically, when the heat load on the hot water utilization device is low, e.g., during summertime, the power produced by converter 50 is maximized. In such case, the states of the valves is as follows:

| Valve | A | B | C | D | E |
|-------|---|---|---|---|---|
| State | 0 | 1 | 1 | 0 | 1 | where state 0 means the valve is closed (i.e., no flow is permitted), and state 1 means the valve is open (i.e., flow is permitted).

When the heat load on the hot water utilization device: is high, e.g., during winter, the power produced by converter 50 is maximized. In such case, the states of the valves is as follows:

| Valve | A | B | C | D | E |
|-------|---|---|---|---|---|
| State | 1 | 0 | 1 | 1 | 0.|

With this arrangement, wherein only two states (i.e., open/closed or on/off) for the valves are permitted, generator 58 will deliver 100% power during the summer, and no power during the winter. In this arrangement, the valves, and the controls therefor, are constructed and arranged so that all of the water supplied to said hot water utilization device either by-passes said converter and is supplied directly to said device, or passes through said converter before being supplied to said device.

Figure 5:
FIG. 5 is a schematic representation of a central control for effecting the operation of the valves that establish the connections between the heat recovery water heater, the hot water utilization device, and the organic Rankine cycle converter.

While the valves may be manually operable, it is preferred that they be electrically or pneumatically operated from a central control as indicated in FIG. 5. In such case, the central control in combination with the valves would constitute means for supplying hot water from the indirect contact heat exchanger in the heat recovery water heater either directly to the hot water utilization device thereby by-passing the vaporizer of said converter, or serially through said vaporizer and the hot water utilization device.

However, the present invention also contemplates an arrangement where the valves can other states (i.e., partially open). In such case, valve E may be partially open to effect a partial flow into vaporizer 52 of converter 50.

Figure 4:
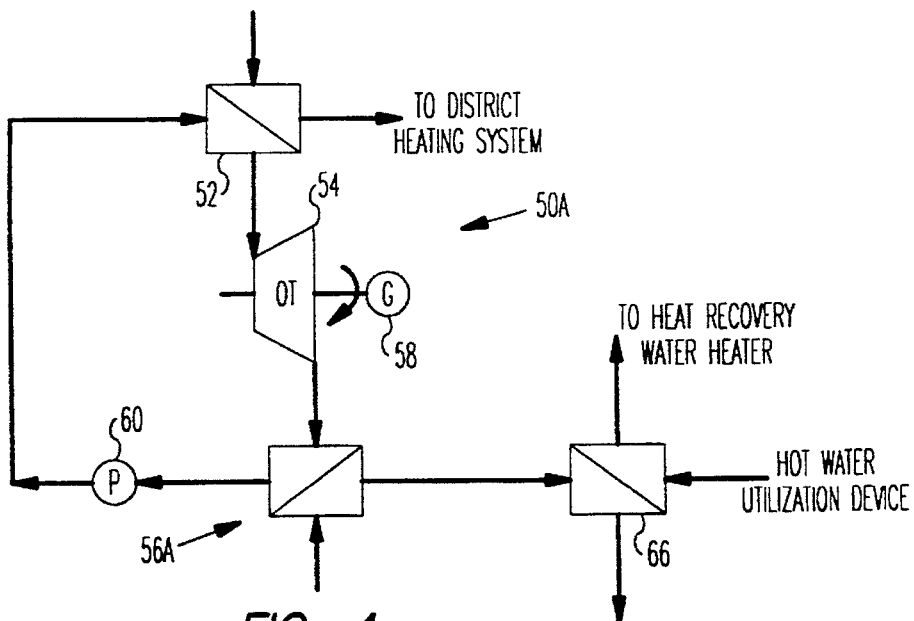
FIG. 4 is a block diagram of a modification of the plant shown in FIG. 2 showing a liquid-cooled condenser for the organic vapor turbine configured to provide preheating of the spent, cooled water from the hot water utilization device.

Because of its simplicity, an air-cooled condenser is preferred for converter 50. However, where circumstances permit, the organic vapor condenser may be cooled by a liquid coolant. This is illustrated in FIG. 4 which shows converter 50A which is similar to converter 50. Converter 50A includes vaporizer 52 supplying organic vapor to organic turbine 54 which drives generator 58 and produced expanded organic vapor which is applied to indirect contact heat exchanger 56A which functions as the condenser for turbine 54. Liquid coolant, e.g., local water, supplied to heat exchanger 56A is heated by the condensation of the expanded organic vapor, and the heated coolant is supplied to preheater 66 which preheats spent water produced by district heating system 12 before the spent water is returned to heat recovery water heater 36.

The advantages and improved results furnished by the method and apparatus of the present invention are apparent from the foregoing description of the preferred embodiment of the invention. Various changes and modifications may be made without departing from the spirit and scope of the invention as described in the appended claims.

I claim:

1. A seasonally configurable combined cycle cogeneration plant of the type having a gas turbine unit for producing power and hot exhaust gases, said plant including:

a) a heat recovery water heater for receiving said exhaust gases and containing an indirect contact heat exchanger for exchanging heat in said exhaust gases with water in said heat exchanger and producing hot water;

b) a hot water utilization device responsive to hot water supplied thereto for utilizing heat in said hot water in an amount that varies seasonally;

c) an organic Rankine cycle converter having a vaporizer responsive to hot water supplied thereto for producing organic vapor, an organic vapor turbine for expanding said organic vapor and producing expanded organic vapor and power, an organic vapor condenser for condensing said expanded organic vapor and producing condensate, and means for returning said condensate to said vaporizer; and d) selectively adjustable valves connecting said heat recovery water heater to said hot water utilization device and to said converter for selectively regulating the distribution of hot water supplied to the vaporizer of said converter and to said hot water utilization device.

2. A seasonally configurable combined cycle cogeneration plant according to claim 1 wherein said valves are constructed and arranged so that all of the water supplied to said hot water utilization device either bypasses said converter and is supplied directly to said device, or passes through said converter before being supplied to said device.

3. A seasonally configurable combined cycle cogeneration plant according to claim 1 wherein said organic vapor condenser is air-cooled.

4. A seasonally configurable combined cycle cogeneration plant according to claim 1 wherein said organic vapor condenser is cooled by a liquid coolant.

5. A seasonally configurable combined cycle cogeneration plant according to claim 1 wherein said organic vapor condenser is cooled by a liquid coolant producing heated coolant, said hot water utilization device producing spent, cooled water that is returned to said heat recovery water heater, and including a preheater responsive to said heated coolant for preheating said spent water before the latter is returned to said heat recovery water heater.

6. A seasonally configurable combined cycle cogeneration plant according to claim 1 wherein said indirect contact heat exchanger includes a plurality of separate coils.

7. A seasonally configurable combined cycle cogeneration plant according to claim 1 including means for selectively adjusting said valves from a central location.

8. A combined cycle cogeneration plant of the type having a gas turbine unit for producing power and hot exhaust gases, said plant comprising:

a) a heat recovery water heater for receiving said exhaust gases and containing an indirect contact heat exchanger for exchanging heat in said exhaust gases with water in said heat exchanger and producing hot water;

b) a hot water utilization device responsive to hot water supplied thereto for utilizing heat in said hot water and producing spent, cooled water that is returned to said heat recovery hot water heater;

c) an organic Rankine cycle converter having a vaporizer responsive to hot water supplied thereto for producing organic vapor, an organic vapor turbine for expanding said organic vapor and producing expanded organic vapor and power, an organic vapor condenser for condensing said expanded organic vapor and producing condensate, and means for returning said condensate to said vaporizer; and d) means for supplying said hot water from said indirect contact heat exchanger either directly to said hot water utilization device thereby by-passing the vaporizer of said converter, or serially through said vaporizer and said hot water utilization device.

9. A combined cycle cogeneration plant of the type having a gas turbine unit for producing power and hot exhaust gases, a heat recovery water heater for receiving said exhaust gases and containing an indirect contact heat exchanger for exchanging heat in said exhaust gases with water in said heat exchanger and producing hot water, a hot water utilization device for receiving water from said heat exchanger and producing spent, cooled water, said plant including:

a) an organic Rankine cycle converter having a vaporizer responsive to hot water supplied thereto for producing organic vapor, an organic vapor turbine for expanding said organic vapor and producing expanded organic vapor and power, and organic vapor condenser for condensing said expanded organic vapor and producing condensate, and means for returning said condensate to said vaporizer; and b) means for selectively connecting said converter between said hot water utilization device and said heat recovery water heater.

* * * * *